United States Patent [19]
Owa et al.

[11] Patent Number: 5,552,926
[45] Date of Patent: Sep. 3, 1996

[54] DEVICE AND METHOD FOR WAVELENGTH CONVERSION AND BBO CRYSTAL FOR WAVELENGTH CONVERSION

[75] Inventors: Soichi Owa; Yoichi Taira, both of Tokyo-to, Japan

[73] Assignee: International Business Machines Corporation, Armonk, N.Y.

[21] Appl. No.: 492,355

[22] Filed: Jun. 19, 1995

[30] Foreign Application Priority Data

Oct. 7, 1994 [JP] Japan .................................. 6-3051234

[51] Int. Cl.$^6$ ...................................................... G02F 1/35
[52] U.S. Cl. ................................................. 359/326; 372/22
[58] Field of Search ...................................... 359/326–332; 372/21, 22

[56] References Cited

U.S. PATENT DOCUMENTS

| | | | |
|---|---|---|---|
| 4,879,722 | 11/1989 | Dixon et al. | 372/21 |
| 5,063,568 | 11/1991 | Chiba et al. | 359/328 X |
| 5,278,869 | 1/1994 | Naya et al. | 359/328 X |
| 5,297,156 | 3/1994 | Deacon | 372/21 |
| 5,345,455 | 9/1994 | Gabriagues et al. | 359/326 X |
| 5,410,561 | 4/1995 | Ogawa | 372/22 |

*Primary Examiner*—John D. Lee
*Attorney, Agent, or Firm*—Thomas R. Berthold

[57] ABSTRACT

Laser light radiated from a laser device 12 enters a resonator 16, and an electric field applied to a BBO crystal 14 inside the resonator 16 modulates the resonance frequency of the resonator 16. The BBO crystal 14 has a modulation electrode 32 and a feedback electrode 34, and a photodetector 18 detects laser light modulated by the BBO crystal 14. A signal in proportion to an error in resonance frequency obtained from the photodetector 18 causes an electric field to be applied to the BBO crystal 14 via the electrode 32 to change the resonance length. Negative feedback control is thus provided to the resonance frequency of the resonator 16 which is determined by the electric field applied to the BBO crystal 14 to substantially eliminate error, thereby synchronizing the resonator 16.

3 Claims, 10 Drawing Sheets

- 10 Wavelength conversion device
- 12 Laser device (light radiation means)
- 14 BBO crystal (nonlinear optical material)
- 16 Resonator (resonance means)
- 18 Optical detector (optical detection means)
- 20 Electric circuit for servo control
- 32 Electrode (first electric field application means)
- 34 Electrode (second electric field application means)

- 10 Wavelength conversion device
- 12 Laser device (light radiation means)
- 14 BBO crystal (nonlinear optical material)
- 16 Resonator (resonance means)
- 18 Optical detector (optical detection means)
- 20 Electric circuit for servo control
- 32 Electrode (first electric field application means)
- 34 Electrode (second electric field application means)

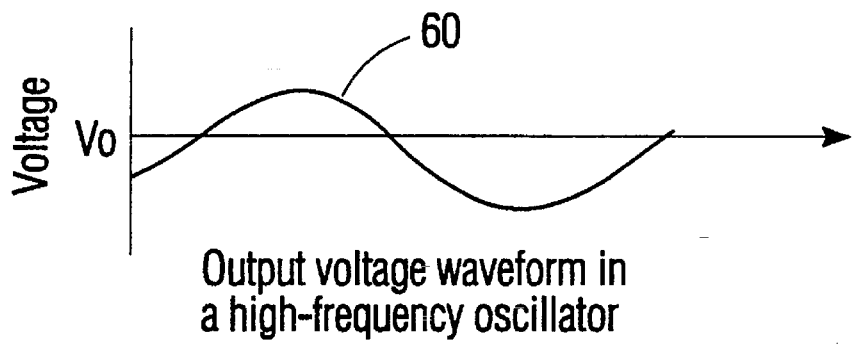
Output voltage waveform in a high-frequency oscillator
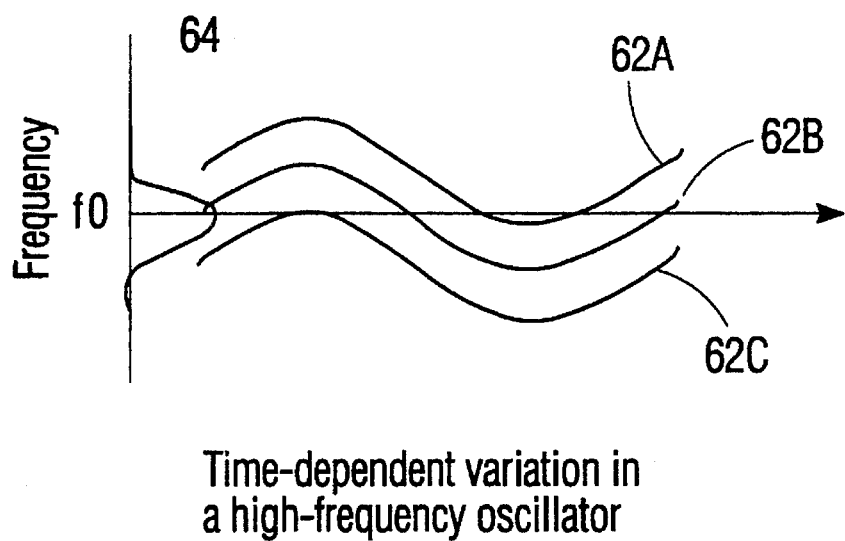
Time-dependent variation in a high-frequency oscillator
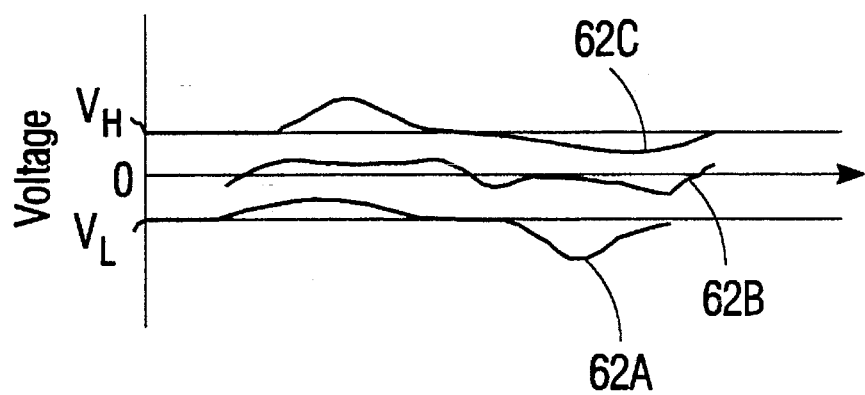
Outputs of a double balanced mixer

DEVICE AND METHOD FOR WAVELENGTH CONVERSION AND BBO CRYSTAL FOR WAVELENGTH CONVERSION

TECHNICAL FIELD

The present invention relates to a device and method for wavelength conversion and BBO crystal for wavelength conversion, and in particular, to a wavelength conversion device to extract, as radiated light, light converted from a wavelength of incident light to a predetermined wavelength by nonlinear optical effect, to a wavelength conversion method for extracting light of a different wavelength converted from light of a predetermined wavelength, and to a BBO crystal used for conversion from light of a predetermined wavelength to light of a different wavelength.

BACKGROUND OF THE INVENTION

A wavelength conversion device is known to obtain ultraviolet light from continuous visible laser radiation of a fundamental wavelength by wavelength conversion using a nonlinear optical material having optical anisotropy, such as a uniaxial crystal. This nonlinear optical effect is a series of phenomena based on nonlinear polarization induced in the nonlinear optical material. Using the second-order nonlinear optical effect from among them, wavelength conversion (generation of a second harmonic, added frequency, differential frequency, and so on) from laser light can be done. For example, it is usual to perform the wavelength conversion of light such as second harmonic generation (SHG) with the nonlinear optical material, such as a beta barium borate crystal (BBO). Thus, the simplest example of the wavelength conversion is second harmonic generation, and the frequency of the converted light is twice that of incident light and, hence, the wavelength of the converted light becomes half. Simply describing the wavelength conversion of the second harmonic generation as an example, the added frequency generation of two wavelengths and the differential frequency generation of the two wavelengths are also similar to this example when incident light is composed of the two wavelength components. In addition, since most nonlinear optical materials are of crystalline form, one of them is referred to as a crystal hereafter.

Since an amplitude of induced nonlinear polarization in the secondary nonlinear optical effect is proportional to the square of an amplitude of an electric field of incident light, converted light power is proportional to the square of input light power, but the proportional constant is fairly small. Thus, generally, light power converted with small conversion efficiency is low.

Thus, it is arranged to externally provide a resonator for the laser device so that the laser beam light incident on a crystal (hereinafter called "excitation light") is enhanced in its power to emit light with twice the frequency or second harmonic (hereinafter called "SHG light") from the crystal.

However, as mentioned above, it is necessary to tune in a resonance frequency of a resonator with a frequency of laser light entering the resonator so as to efficiently generate SHG light from a crystal using the resonator. This requires feedback control to detect an error of a resonance frequency to suppress the frequency shift of laser light entering the resonator and to tune in a light frequency through the changing of the resonator length of the resonator.

Hence, a conventional wavelength conversion device 100 comprises an electrooptical modulator (hereafter "EO modulator") 108, having an electrooptical effect, disposed between a laser device 102 and a resonator 106 as shown in FIG. 13. Laser light L0 radiated from the laser device 102 enters the resonator 106 through the EO modulator 108. On an extended optical path of laser light L1 radiated from the EO modulator 108, an optical detector 112 connected to an electric circuit 110 is disposed for servo control to drive the EO modulator 108. The electric circuit 110 for servo control is to provide the electric field so as to cause the electrooptical effect at the EO modulator 108.

The resonator 106 comprises an incident mirror 114, sampling mirror 116, first mirror 122, and second mirror 124. Laser light L1 entering the resonator 106 arrives at the sampling mirror 116 through the incident mirror 114 on optical path L1a. The sampling mirror 116 radiates light partially sampled from incident light to the optical detector 112, and guides residual light through reflection to optical path L1b. Light reflected with the sampling mirror 116 arrives at the first mirror 122. The first mirror 122 guides the light to optical path L1c through total reflection. On optical path L1c, the crystal 104 is disposed, and the light reflected with the first mirror 122 arrives to the second mirror 124 through the crystal 104. Thus, the crystal 104 radiates SHG light converted in accordance with incident light with light not converted. The second mirror 124 reflects light not converted at the crystal 104 out of the incident light and transmits converted SHG light L2. Light reflected with the second mirror 124 is guided to optical path L1d and arrives at the incident mirror 114.

At the incident mirror 114, an incident light axis in parallel to optical path L1d and a reflection light axis in parallel to optical path L1a are adjusted, and the incident mirror 114 guides light proceeding on optical path L1d through reflection to optical path L1a.

The wavelength conversion device 100 in such a configuration detects an error of a resonance frequency, i.e., difference between the light frequency and the cavity resonance frequency from a detection signal of an optical detector 112. To detect the frequency difference, the wavelength conversion device 100 needs to modulate laser light L0 through frequency modulation (and phase modulation) of the EO modulator 108 at a high frequency. This is referred to as the FM sideband method, as described by Michio Oka et al., *Jpn. J. Appl. Phys.*, Vol. 31, 1992, page 531; and R. Drever et al., Appl. Phys, B, Vol. 31, 1983, page 97.

However, error detection in a conventional wavelength conversion device 100 has the following problems:

1. Loss of incident power arises due to the surface reflection and internal absorption of the EO modulator. Because of this, the power of incident visible light is lowered, and the final output of SHG light is also lowered.

2. Because of the optical aberration in the EO modulator, wavefronts of laser light radiated from the EO modulator are perturbed and, hence, the coupling efficiency of laser light to the resonator is lowered and therefore SHG light output is also lowered.

3. Since the EO modulator is disposed between a laser device and the resonator, the entire system becomes large.

4. Since the configuration of the EO modulator is necessary, its cost becomes expensive.

In addition, in the conventional wavelength conversion device 100, installing the first mirror 122 on a piezoelectric element (an element to convert electrical signals to displacement), feedback control to tune in a frequency makes the resonator length change through making the first mirror 122 displaced and makes the resonance frequency change.

However, since the first mirror 122 has inertia mass, the response characteristic to a high frequency is lowered.

Moreover, the response to the frequency fluctuation of incident light at more than several kHz is difficult because of physical limitations of the piezoelectric element. Therefore, when the frequency fluctuates faster than the mirror displacement can be made, the power of SHG light, that is, the output light, fluctuates or synchronization becomes impossible due to the failure of servo control. These are problems in the conventional wavelength conversion device 100.

Taking into consideration the above facts, the object of the present invention is to obtain, in a small and easy-to-use configuration, a wavelength conversion device and wavelength conversion method capable of efficiently converting incident light to light of a converted wavelength without lowering the light output of the converted wavelength.

Furthermore, another object is to obtain a BBO crystal for wavelength conversion to simplify resonator length conversion used for the conversion of incident light to light of a converted wavelength.

SUMMARY OF THE INVENTION

For attaining the above objects, the invention is focused on the phenomena of the electrooptical effect that occurs in a nonlinear optical crystal, and has established it concretely as a wavelength conversion device. More specifically, the wavelength conversion device, according to the present invention, comprises (a) a resonance means located at a radiation section of a light radiation means that radiates light of a fundamental wavelength having a resonance frequency in accordance with a resonator length equal to the length of an optical path for light passing inside the resonance means, and including a plurality of reflection means for reflecting said light inside the resonance means; (b) a nonlinear optical material disposed on the optical path for light passing inside said resonance means having optical anisotropy and radiating incident light and light of at least one converted wavelength differing from that of the incident light; and (c) an electric field application means for applying an electric field to said nonlinear optical material so that the resonance frequency of said resonance means can be tuned in to said light of the fundamental wavelength.

In the invention, said electric field application means can apply an electric field to modulate said resonator length to said nonlinear optical material so that a resonance frequency of said resonance means tunes in said light of the fundamental wavelength.

The invention further can comprise an optical detection means located so as to be irradiated by light for detecting the intensity of incident light, wherein said electric field application means comprises a first electric field application means for applying an electric field to said nonlinear optical material to modulate said resonance frequency, and a second electric field application means for applying an electric field to said nonlinear optical material so that resonance frequency obtained from the detected intensity of light equals the frequency of said light of the fundamental wavelength.

The invention further can comprise a BBO crystal or an LBO crystal as said nonlinear optical material.

In the invention, said resonance means can further include a reflection-transmission means located at a radiation section of said nonlinear optical material for reflecting said light of the fundamental wavelength so that the shape of the cross-section of its optical beam with respect to a plane passing through the optical axis will differ from that of the incident optical beam, and transmitting said light of the converted wavelength, and a reflection means disposed between said nonlinear optical material and said light radiation means for reflecting light reflected by said reflection-transmission means so that it will pass through an optical path approximately equal to a reference optical path through which said light of the fundamental wavelength that enters said nonlinear optical material passes and the shape of the cross-section of its optical beam will be approximately equal to that of said light of the fundamental wavelength.

The invention is a wavelength conversion device wherein at least one of said reflection-transmission means and said reflection means in said resonance means comprises a transmission component that radiates light entering from a specified direction and also radiates, as reflected light, light entering from a direction differing from the specified direction, and a reflection component reflecting light from the specified direction which is radiated from the transmission component to guide it to said transmission component, an odd number of beam-condensing sites where light is condensed located between said reflection component and said transmission component, said resonance means having an even number of beam-condensing sites inside.

The invention is a method for using a nonlinear optical material having optical anisotropy and radiating incident light of the fundamental wavelength and light of at least one converted wavelength differing from the fundamental wavelength to convert said light of the fundamental wavelength to said light of the converted wavelength, wherein light of the fundamental wavelength is allowed to enter said nonlinear optical material and an electric field is applied to said nonlinear optical material for the resonator length to resonate said light of the fundamental wavelength.

The invention comprises a BBO crystal for wavelength conversion provided in a wavelength conversion device for radiating light of a converted wavelength to change the optical path length when an electric field is applied to the BBO crystal.

BRIEF DESCRIPTION OF THE DRAWINGS

FIG. 3 is a graph showing output voltage waveforms of a high-frequency oscillator in an electric circuit for servo control.

FIG. 4 is a graph showing the time-dependent variation of resonance frequencies of a resonator.

FIG. 5 is a graph showing output voltage waveforms of a DBM in an electric circuit for servo control.

DETAILED DESCRIPTION

Figure 1:
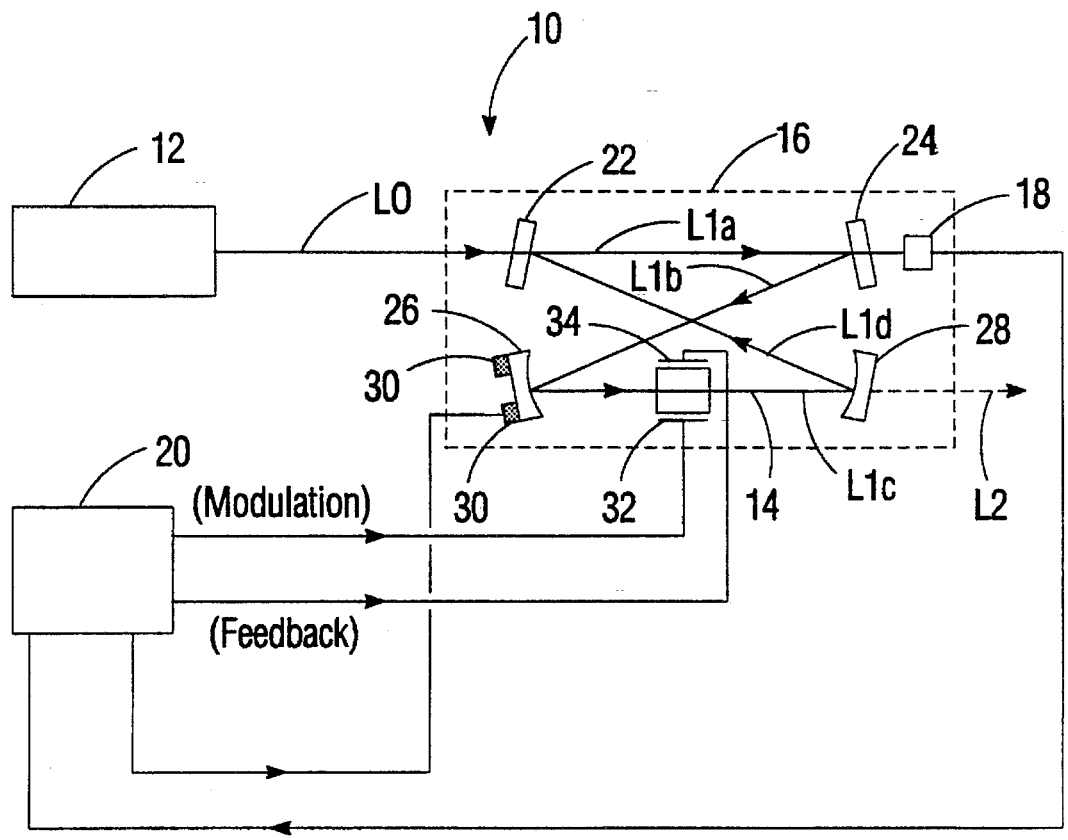
FIG. 1 is a conceptual drawing showing a schematic configuration of a wavelength conversion device according to a first embodiment of the present invention.

In a wavelength conversion device according to the present invention, a resonance means is located at a radiation section of a light radiation means, such as a laser device, that radiates light of a fundamental wavelength. The resonance means has a resonance frequency in accordance with a resonator length equal to the length of an optical path for light passing inside the resonance means, and includes a plurality of reflection means for reflecting said light inside the resonance means. A nonlinear optical material is disposed on the optical path for light passing inside said resonance means. The nonlinear optical material has optical anisotropy, and radiates incident light and light of at least one converted wavelength differing from that of the incident light. An electric field application means applies an electric field to said nonlinear optical material so that the resonance frequency of said resonance means can be tuned in to said light of the fundamental wavelength. Hence, since it is possible to tune in to the resonance means with only the electric field applied to the nonlinear optical material, a wavelength conversion device with simple synchronization can be provided without an additional EO modulator.

In addition, in said wavelength conversion device, the electric field application means can apply an electric field to modulate a resonator length to the nonlinear optical material so that a resonance frequency is tuned in to the light of the fundamental wavelength. In this manner, if the electric field is applied to the nonlinear optical material, light radiated from the nonlinear optical material can be modulated and consequently the resonator length can be changed and tuned in to a resonance frequency of the resonance means.

Moreover, said wavelength conversion device further comprises an optical detection means located so as to be irradiated by light for detecting the intensity of incident light, wherein said electric field application means comprises a first electric field application means for applying an electric field to said nonlinear optical material to modulate said resonance frequency, and a second electric field application means for applying an electric field to said resonance frequency obtained from the detected intensity of light equal to the frequency of said light of the fundamental wavelength. In this configuration, the resonance frequency of the resonance means can be easily detected. Thus, light radiated from the nonlinear optical material is modulated by the electric field applied by the first electric field application means. Therefore, in the optical detection means, the intensity of light in accordance with this modulation is detected. Since transition of the frequency can be detected from the intensity of light in accordance with this modulation, an error between the resonance frequency obtained from the intensity of detected light and the frequency of the light of the fundamental wavelength can be detected. Therefore, the resonance frequency of the resonance means can be tuned in to the light of the fundamental wavelength through applying the electric field in accordance with this error to the nonlinear optical material using the second electric field application means.

Here, as described in an article by Chris A. Ebbers, *Appl. Phys. Lett.*, Vol. 52, 1988, page 1948, since a nonlinear optical material, especially a BBO crystal, has only a small electrooptical effect, the influence of the electrooptical effect was not considered. In this wavelength conversion device, an electric field is applied to the nonlinear optical material with the electric field application means so that the resonance frequency of the resonance means is tuned in to the light of the fundamental wavelength. This nonlinear optical material can comprise the BBO crystal. In this configuration, the nonlinear optical material that was not used for said tuning because of its small electrooptical effect can be comprised so as to also function as an EO modulator.

In this manner, although the electrooptical effect of the BBO crystal in accordance with the applied electric field changes, the BBO crystal is not limited to only tuning of the resonance frequency. Thus, the BBO crystal can be provided as the wavelength conversion device radiating the light of a converted wavelength differing from the fundamental wavelength so that an optical path length changes due to electric field application. With this configuration, the BBO crystal can be used as a good responsive conversion element of an optical path length. Hence, in the wavelength conversion device, the BBO crystal can be applied to delicate and high-speed control in changing an optical path length.

In said wavelength conversion device, the resonance means can be comprised to include the reflection-transmission means and the reflection means.

The reflection-transmission means is located at a radiation section of said nonlinear optical material for reflecting said light of the fundamental wavelength so that the shape of the cross-section of its optical beam with respect to a plane passing through the optical axis will differ from that of the incident optical beam, and transmitting said light of the converted wavelength. Hence, in the reflection-transmission means, only light of the fundamental wavelength out of light arriving at the reflection-transmission means as a forward path from the light radiation means is reflected. Since reflected flux in this reflection has the shape of a cross-section differing from the shape of the incident optical beam, light proceeding to the nonlinear optical material as a backward path after reflection by the reflection-transmission means does not coincide with conditions, such as phase matching of the nonlinear optical material. Thus, the generation of the light of at least one light of the converted wavelength differing from the fundamental wavelength on the backward path becomes approximately zero.

The reflection means is located at the incident section of the nonlinear optical material for reflecting light reflected by said reflection-transmission means so that it will pass through an optical path approximately equal to a reference optical path through which said light of the fundamental wavelength that enters said nonlinear optical material passes and the shape of the cross-section of its optical beam will be approximately equal to that of said light of the fundamental wavelength. Thus, light arriving at the reflection means as the backward path from the reflection-transmission means is reflected so that the shape of the cross-section of its optical beam is equal to that of light proceeding to the nonlinear optical material as the forward path from the light radiation means. Therefore, in the reflection means, light reflected after proceeding on the backward path from the reflection-transmission means is added to the incident light from the light radiation means, and the added light proceeds to the nonlinear optical material. Accordingly, since the light not converted to the light of the converted wavelength in proceeding on the forward path among the light of the fundamental wavelength proceeds again on the forward path, the nonlinear optical material generates, for example, the light of at least one converted wavelength differing from the fundamental wavelength only in one direction, the forward path.

The reflection-transmission means and reflection means each can comprise a curved surface, such as a spherical surface, and the focal length and reflection optical path of each curved surface is approximately equal. In this structure, since a resonance means can be composed of a so-called confocal resonator, entered light can be enclosed, the light thus circulating inside the resonance means.

Furthermore, at least one of said reflection-transmission means and said reflection means in said resonance means can comprise a transmission component that radiates light entering from a specified direction and also radiates, as reflected light, the light entering from a direction differing from the specified direction, and a reflection component reflecting light from the specified direction which is radiated from the transmission component to guide it to said transmission component, an odd number of beam-condensing sites where light is condensed located between said reflection component and said transmission component, said resonance means having an even number of beam-condensing sites inside. This beam-condensing site means the beam-condensing site where light is condensed between said reflection component and said transmission component when at least one of said reflection-transmission means and said reflection means comprises a transmission component, such as a lens and a reflection surface that radiates light entering from a specified direction and also radiates, as reflected light, light entering from a direction differing from the specified direction; and a reflection component, such as a reflection surface reflecting light from the specified direction which is radiated from the transmission component to guide it to said transmission component. In this structure, since a resonator can be composed of a so-called double confocal resonator, entered light can be enclosed, the light circulating thus in the resonance means if the optical axis of the incident light and so on is a little bit off center.

Thus, if the resonance means includes the reflection-transmission means and reflection means, light transmitted to a nonlinear optical material to generate light of at least one converted wavelength differing from the fundamental wavelength, such as SHG light, with reflection means and reflection-transmission means, is radiated through the reflection means and reflection-transmission means again to the nonlinear optical material. Since much light of a converted wavelength is not transmitted together in the nonlinear optical material, a wavelength conversion device that has a simple structure, easy adjustment, and low cost can be obtained and, since the converted light is not generated in both directions, the lack of stability due to the interference effect does not occur.

The invention is a wavelength conversion method for using a nonlinear optical material having optical anisotropy and radiating incident light of the fundamental wavelength and light of at least one converted wavelength differing from the fundamental wavelength to convert said light of the fundamental wavelength to said light of the converted wavelength, wherein light of the fundamental wavelength is allowed to enter said nonlinear optical material and an electric field is applied to said nonlinear optical material for the resonator length to resonate said light of the fundamental wavelength. Hence, the resonator length can be modulated when incident light is converted to light of the converted wavelength, and this method in accordance with the applied electric field can convert at least one light of the converted wavelength to converted light in accordance with the resonator length.

Preferred Embodiment

In the following, the embodiment of the present invention will be described in detail with reference to the drawing. The first embodiment is the application of the present invention to a wavelength conversion device including a ring resonator.

As shown in FIG. 1, a wavelength conversion device 10 according to the present invention comprises a laser device 12 as a light radiation means, a resonator 16 as a resonance means, and an electric circuit 20 for servo control. The resonator 16 is located at the radiation section of laser light of the laser device 12. Laser light at a frequency, for example, about $6 \times 10^{14}$ Hz is radiated from the laser device 12.

Figure 13:
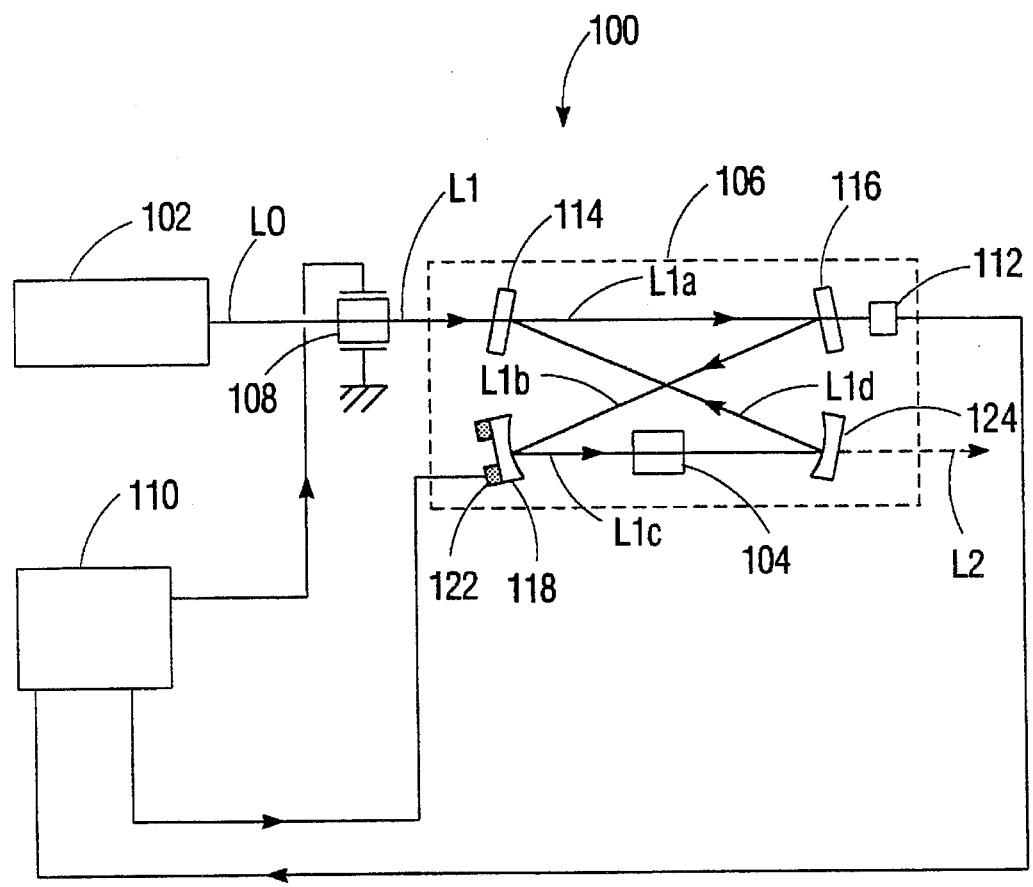
FIG. 13 is a block diagram showing a schematic configuration of a conventional wavelength conversion device.

The resonator 16 has a configuration similar to the resonator 100 shown in FIG. 13 and comprises an incident mirror 22, sampling mirror 24, first mirror 26, and second mirror 28. Laser light L0 radiated from the laser device 12 enters the resonator 16, passes the incident mirror 22, and arrives at the sampling mirror 24 on optical path L1$a$. The sampling mirror 24 samples a part of the entering light, reflects residual light not sampled, and guides it to optical path L1$b$. On extension of optical path L1$a$, an optical detector 18 is located as an optical detection means, and the light sampled by the sampling mirror 24 is irradiated. The light reflected by the sampling mirror 24 arrives at the first mirror 26. The first mirror 26 performs total reflection of the light, and guides it to optical path L1$c$. On optical path L1$c$, a BBO crystal 14 is located as a nonlinear optical material, and the light reflected by the first mirror 26 arrives at the second mirror 28 through the BBO crystal 14. Thus, the BBO crystal 14 radiates SHG light converted in accordance with incident light with light not converted. The second mirror 28 reflects the light not converted at the BBO crystal 14 among incident light, and transmits SHG light L2. The light reflected by the second mirror 28 is guided to optical path L1$d$, and arrives at the incident mirror 22. Since the optical axis of incident light in parallel to optical path L1$d$ and the optical axis of reflected light in parallel to optical path L1$a$ are adjusted, the incident mirror 22 reflects the light proceeding on optical path L1$d$, and guides it to optical path L1$a$.

The first mirror 26 of the resonator 16 is attached to an installation device (not shown in the drawing) capable of displacement, the installation device (not shown) being installed on the resonator itself 16 through a piezoelectric element 30. The piezoelectric element 30 is used for changing the resonance frequency through the changing of the resonator length through the displacement of the first mirror 26, and is connected to the electric circuit 20 for servo control. Two electrodes 32 and 34 are located on the BBO crystal 14 of the resonator 16, and these electrodes 32 and 34 are connected to the electric circuit 20 for servo control. In addition, the optical detector 18 is also connected to the electric circuit 20 for servo control. An electric field application means comprises these electrodes 32 and 34 and an electric circuit 20 for servo control. Moreover, a first electric field application means comprises the electrode 32 and electric circuit 20 for servo control, and a second electric field application means comprises the electrode 34 and electric circuit 20 for servo control.

Operation of the wavelength conversion device 10 of this embodiment will be described next. As mentioned above, since a resonance frequency of the resonator 16 should be tuned in to the frequency of laser light entering the resonator 16 so as to efficiently generate SHG light from the BBO crystal 14 using the resonator 16, feedback control is necessary to detect any error in the resonance frequency of the resonator 16 and to tune the resonator 16.

First, feedback control detects a gap in the resonance frequency so as to maintain conditions to tune the resonance frequency of the resonator 16 to the frequency of laser light entering the resonator 16. The FM sideband method is used for this detection.

This embodiment makes laser light directly enter the resonator 16 without modulating the frequency of laser light radiated from the laser device, and modulates the resonance frequency of the resonator 16 through directly modulating the BBO crystal 14 located inside the resonator 16. Thus, the refractive index of the BBO crystal 14 is changed by the electrooptical effect with the application of an electric field. The optical path length of the BBO crystal 14 changes through this change in the refractive index of the BBO crystal 14, an optical path length of the resonator 16, that is, the resonator length changes, and the resonance frequency of the resonator 16 changes. Since the BBO crystal 14 has a good responsive characteristic to a high frequency, the resonance frequency can be modulated by a high frequency through applying an electric field of a high frequency to the BBO crystal 14. Using the electrode 32 located on the BBO crystal 14 as an electrode for modulation, the BBO crystal 14 is applied to the electric field through the electrode 32. The signal, in proportion to the error of the resonance frequency of the resonator 16, is obtained through detecting with the optical detector 18 the laser light modulated by a high frequency at the BBO crystal 14.

The feedback control using the electrooptical effect of the BBO crystal 14 will be described next. As mentioned above, the BBO crystal 14 has a phenomenon that the refractive index changes through occurrence of the electrooptical effect through the application of an electric field. Thus, using the signal in proportion to the error of the resonance frequency obtained from the optical detector 18 as a signal to change the resonator length (electric field application to the BBO crystal 14 through the electrode 32), the error can be maintained at zero (servo control) through performing feedback with the signal in proportion to the error of the resonance frequency of the resonator 16 determined by the BBO crystal 14 through the application of an electric field (that is, negative feedback).

This embodiment, as mentioned above, sets the electrode 32 for modulation between two electrodes 32 and 34 located on the BBO crystal 14, and sets the different electrode 34 for feedback. This embodiment applies the electric field in proportion to the error signal through the supplying of the signal to this electrode 34. The feedback control by the electrooptical effect of the BBO crystal 14 can effectively apply the electric field at a higher frequency than control by the piezoelectric element 30.

Conventionally, a mirror composing a resonator is located on a piezoelectric element so as to control the resonator length, together with a method for actually moving the mirror but, in the conventional method using a piezoelectric element, response at several kHz of frequency is the limitation of the high-frequency drive due to mechanical reasons. Since this embodiment directly controls the BBO crystal 14, good control can be performed even if the fluctuation in the frequency of laser light has a component at more than several kHz.

In addition, in control of the resonator length, control by the piezoelectric element 30 can be set in a wider range of resonator length change than control by the electrooptical effect of the BBO crystal 14. Considering the mechanical control range of the piezoelectric element 30, this embodiment performs feedback control of the resonator length by the piezoelectric element 30 at a low frequency and by the BBO crystal 14 at a high frequency and thus, this embodiment controls the resonator length using both control methods so as to derive the maximum effect with efficient control that is adaptive frequency ranges.

As a configuration of the resonator 16, forming the BBO crystal 14 in thickness 9 mm and setting a frequency for high-frequency modulation at 2 MHz and an amplitude at 15 V (peak-to-peak) in an experiment obtained good operating results.

Operation of the wavelength conversion device 10 will be further described subsequently with an actual configuration of the electric circuit 20 for servo control.

Figure 2:
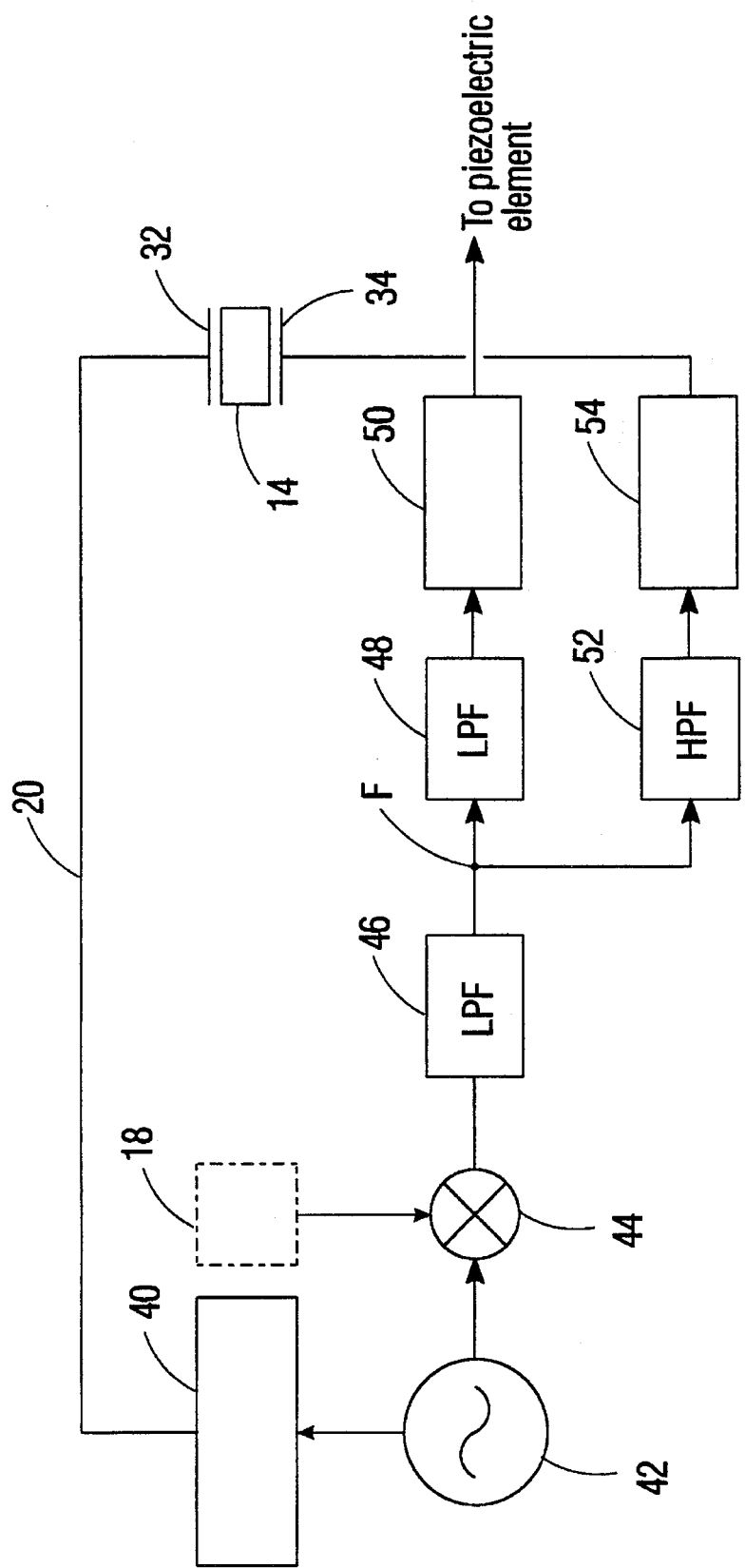
FIG. 2 is a block diagram showing a schematic configuration of an electric circuit for servo control in FIG. 1.

The electric circuit 20 for servo control shown in FIG. 2 comprises a high-frequency oscillator 42. This high-frequency oscillator 42 is connected to the electrode 32 of the BBO crystal 14 through an EO element driver 40, and to an input port of a double-balanced mixer (hereafter "DBM") 44. Another input port of the DBM 44 is connected so that signals from the optical detector 18 are input. The DBM 44 is connected to a low-pass filter (hereafter "LPF") 46, and the LPF 46 is connected to a LPF 48 and a high-pass filter (hereafter "HPF") 52. The LPF 48 is connected to the piezoelectric element 30 through a piezoelectric element driver 50. The HPF 52 is connected to the electrode 34 of the BBO crystal 14 through the EO element driver 54.

Electrical signals 60 (shown in FIG. 3) at the predetermined frequency (e.g., 2 MHz) are output by the high-frequency oscillator 42, one of which is output to the electrode 32 of the BBO crystal 14 through the EO element driver 54 and to an input port of the DBM 44. This DBM 44 outputs a signal corresponding to a product of a signal detected at the optical detector 18 and an electrical signal 60 at the predetermined frequency output from the high-frequency oscillator 42.

On the one hand, applying an electric field at a high frequency to the BBO crystal 14 as an EO element located in the resonator 16, the resonator length of the resonator 16 is modulated in accordance with the magnitude of the electric field and, consequently, the center frequency of the resonator 16 changes from a standard frequency f0 on a time scale. Thus, when the frequency of incident laser light coincides with the resonance frequency of the resonator 16, that is, the resonator length of the resonator 16 fulfills a coincidence condition with an integral multiple of a wavelength of the incident laser light (hereafter "resonance condition"), as shown at signal 62B in FIG. 4, centering frequency f0, shapes and amplitudes of a signal waveform of the optical detector 18 in the case in which the resonator length is longer than the center value (higher than frequency f0 in FIG. 4) and a signal waveform of the optical detector 18 in the case in which the resonator length is shorter (lower than frequency f0 in FIG. 4) become approximately equal to each other. Therefore, the distribution 64 of a transmission frequency characteristic becomes approximately symmetrical in the center of frequency f0. Accordingly, a high-frequency output becomes the product of the electric field strength. Thus, the average value of an output of the DBM 44 becomes approximately zero, because the contribution of the positive part of the output and the negative part becomes equal (refer to signal 66B in FIG. 5).

On the other hand, if the resonator length is longer than the resonance condition, as shown at signal 62C in FIG. 4, the resonance frequency of the resonator 16 shifts to negative. Thus, since an output of the optical detector 18 becomes large through the shifting of the resonator length to negative, an output of the DBM 44 shifts to positive on the average (refer to the signal 66C in FIG. 5 ). Moreover, if the resonator length is shorter than the resonance condition, as shown at signal 62A in FIG. 4, the resonance frequency of the resonator 16 shifts to positive, similarly. Accordingly, since a signal of the optical detector 18 becomes low through the shifting of the resonator length to positive, the output of the DBM shifts to positive on the average (refer to signal 66A in FIG. 5).

Therefore, the output of the LPF 46 supplying a value averaged for the output of the DBM 44 shows a change in the resonator length from the resonance condition of the resonator 16. Thus, using a signal showing a change in the resonator length, the resonator length can be controlled to always resonate with the frequency of incident laser light if feedback to change the resonator length of the resonator 16 is performed.

As mentioned above, in addition to the changing of the resonator length using the output signal of the DBM 44, and in addition to the installed device as a supporting mechanism for the first mirror 26 composing a resonator, comprising a piezoelectric element (electric distortion element or electromagnetic element) moving in parallel in proportion to a voltage, a method also exists for placing in the resonator 16 a rotary glass plate whose refractive indices from low to high are distributed around the circumference and to adjust its rotation angle with voltage, and other methods to combine a plurality of these mechanisms.

Figure 6:
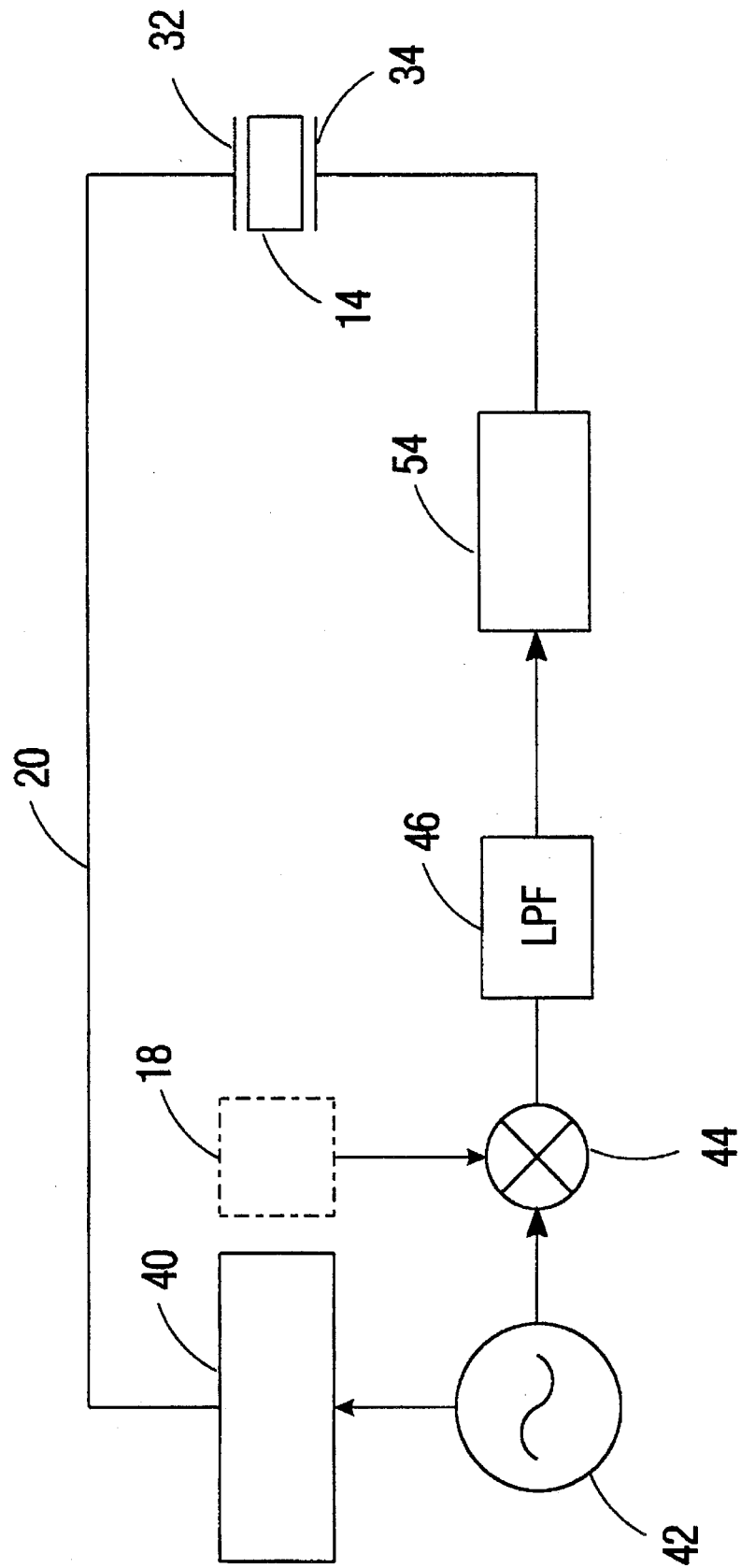
FIG. 6 is a block diagram showing the configuration of an electric circuit for servo control of another embodiment in FIG. 1.

In a wavelength conversion device 10 of this embodiment, although the case of control using both the BBO crystal 14 (EO element) and the piezoelectric element 30 is described as shown in FIG. 6, it is possible to apply a voltage to the electrode 34 located on the BBO crystal 16 through the amplification of a signal at point F in FIG. 2 without controlling the piezoelectric element 30 as the simplest configuration.

In this manner, in the wavelength conversion device of this embodiment, two electrodes for high-frequency modulation and for the application of a tuning signal (direct current and a low-frequency component) are located on the BBO crystal (nonlinear optical material). Thus, this method can provide a compact, low-cost wavelength conversion device converting the laser light of a predetermined wavelength to SHG light through the nonlinear optical effect without using the EO modulator which is required by a conventional wavelength conversion device.

In addition, through the electric field application to the BBO crystal through the two electrodes for high-frequency modulation and for applying a tuning signal, high-frequency modulation becomes possible, tuning becomes easy, and higher output of obtained SHG light can be performed. Moreover, through the increase in the responsive characteristic of servo control which derives from high-frequency modulation, the output light strength can be stabilized and the stability of the servo control can be increased.

Increasing the stability of this servo control, a resonator at a small tuning range can be used. Generally, a resonator for a wavelength conversion device in high conversion efficiency to obtain UV light from visible light has a small tuning range. Therefore, through this embodiment, a wavelength conversion device can be easily attained through high conversion efficiency to obtain from visible light to SHG light.

In the above embodiment, although the case is described in which the present invention is applied to a ring resonator, the present invention is not limited to this, and the confocal resonator hereafter described is a resonator to which the present invention can also be applied. In addition, using the following confocal resonator, a compact wavelength conversion device that has a lower number of parts and fewer movable parts than wavelength conversion devices of the above embodiment can be fabricated. A wavelength conversion device 11 using this confocal resonator will be described as a second embodiment of the present invention. Additionally, since this embodiment has an approximately similar configuration to the above embodiment, the same numbers are used for the same pans, and only the resonator that has a different structure will be described hereafter.

Figure 7:
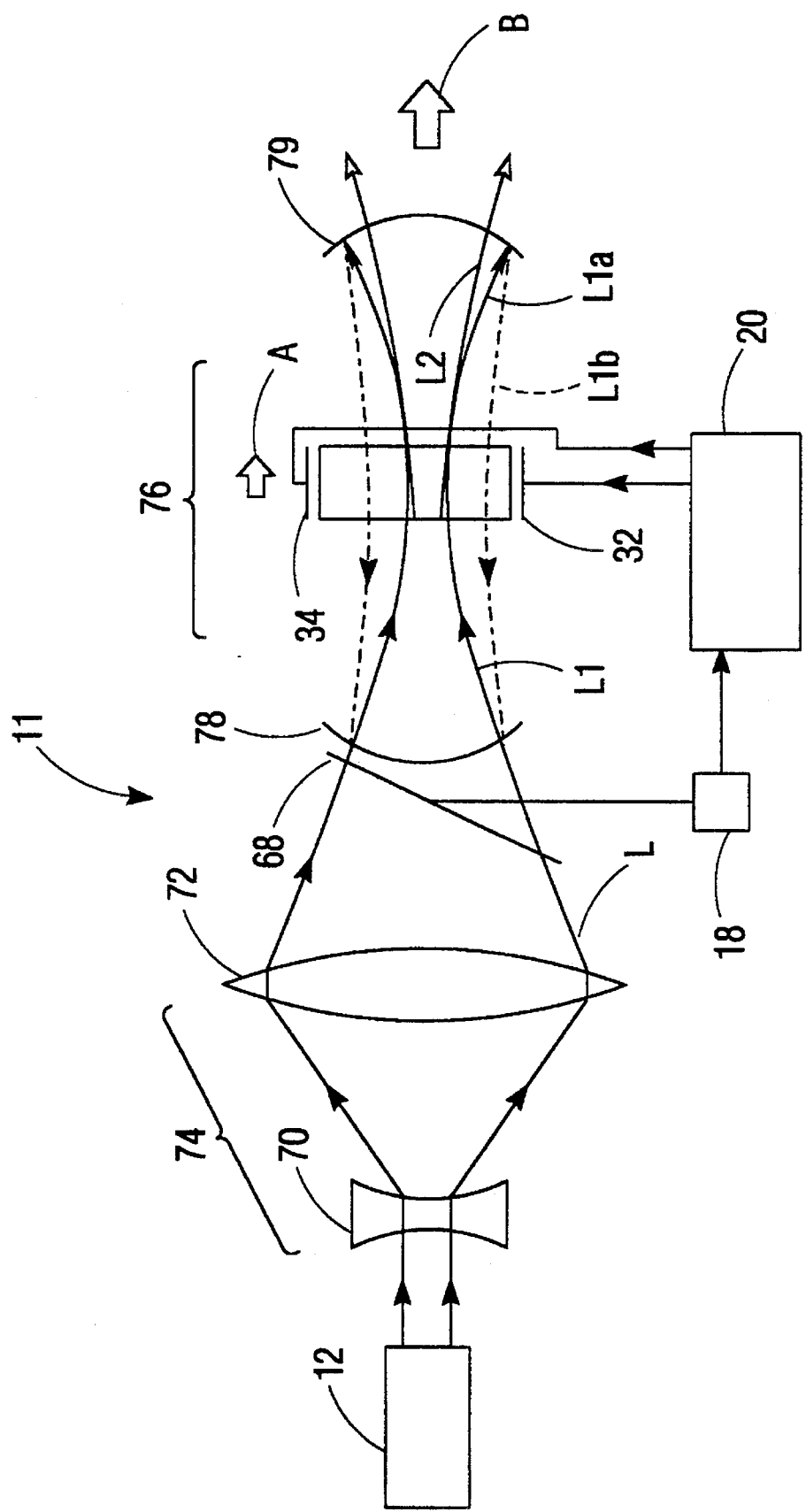
FIG. 7 is a conceptual drawing showing the configuration of a wavelength conversion device according to a second embodiment of the present invention.

As shown in FIG. 7, a wavelength conversion device 11 of this embodiment comprises a laser device 12 radiating laser light of the predetermined wavelength. A collimator lens system 74 is located at the radiation section of the laser device 12. This collimator lens system 74 comprises a concave lens 70 as a beam-diffusion means and a convex lens 72 as a beam-condensing means, and the concave lens 70 and convex lens 72 are located in this order. Laser light radiated from the laser device 12 is condensed by the convex lens 72 after diffusion by the concave lens 70. This collimator lens system 74 is used for adjusting the wavefronts of light and the beam diameter of laser light, and beam-condensing sites, so-called beam waists, where laser light is condensed, are formed at the radiation section of the collimator lens system 74. A radiation means comprises this laser device 12 and collimator lens system 74.

A resonator 76 is located at the laser light radiation section in the collimator lens system 74. This resonator 76 comprises a first mirror 78 and second mirror 79 located from the laser light radiation section of the collimator lens system 74 in this order. The first mirror 78 and second mirror 79 are formed from spherical mirrors of the same radius of curvature. Thus, the focal lengths of the first mirror 78 and second mirror 79 coincide with each other. The resonator 76 of this embodiment forms a so-called confocal resonator through disposing the first mirror 78 and second mirror 79 so that the positions of their focal lengths coincide with each other and through disposing them so that the centers of their curvature coincide on a line. This resonator 76 is displaced so that the beam-condensing site, where the above laser light is condensed, and so-called beam waists are positioned near the focal point.

In addition, a sampling mirror 68 is located between the above convex lens 72 and the resonator 76. The optical detector 18 is located at the opposite side of this sampling mirror 68.

In this embodiment, the radiuses of curvature of the first mirror 78 and second mirror 79 are set larger than that of the wavefronts of the laser light. Therefore, at each of the first mirror 78 and second mirror 79, the curvatures of wavefronts of incident light is changed when it is reflected.

Near the above beam-condensing site, or so-called beam waist, the BBO crystal 14 is located so that the beam waist is positioned inside the BBO crystal 14. Since the BBO crystal 14 has a sufficiently large receptive angle, the SHG light of a converted wavelength obtained from a light beam of a fundamental wavelength (excitation light) by the nonlinear optical effect is efficiently output when the light beam coinciding with the large receptive angle in the BBO crystal 14 enters. Moreover, two electrodes 32 and 34 are located on the BBO crystal 14, and these electrodes 32 and 34 are connected to the electric circuit 20 for servo control. Furthermore, the optical detector 18 is also connected to the electric circuit 20 for servo control.

The operation of the resonator 76 of this embodiment will be described next. Laser light L radiated from the collimator lens system 74 arrives at the inside of the BBO crystal 14 through a first mirror 78, the beam diameter gradually decreasing, and then beam waists are formed in the crystal. In addition, laser light L that passed the first mirror 78 acts as excitation light L1 so as to obtain SHG light of a converted wavelength in the BBO crystal 14. In the BBO crystal 14, SHG light L2 is generated by the nonlinear optical effect. Generated SHG light L2 is used as output light (light in the direction shown by the white arrow B in FIG. 7) through the second mirror 79. Residual excitation light L1a not converted to SHG light L2 is reflected and the radius of curvature of its wavefront is changed at the second mirror 79. When the radius of curvature of its wavefront is changed, it is changed so as to diffuse in the diffusion direction, its beam diameter not being changed in the shrinking direction. Excitation light L1b, the radius of curvature of its wavefront changed, arrives at the first mirror 78 through the BBO crystal 14. The radius of curvature of the wavefront of excitation light L1b is changed so as to coincide with that of laser light L (i.e., excitation light L1) radiated from the collimator lens system 74, and excitation light L1b is reflected at the first mirror 78. Excitation lights L1 and L1a arrive at the BBO crystal 14. In this manner, excitation light circulates in the resonator.

Figure 8:
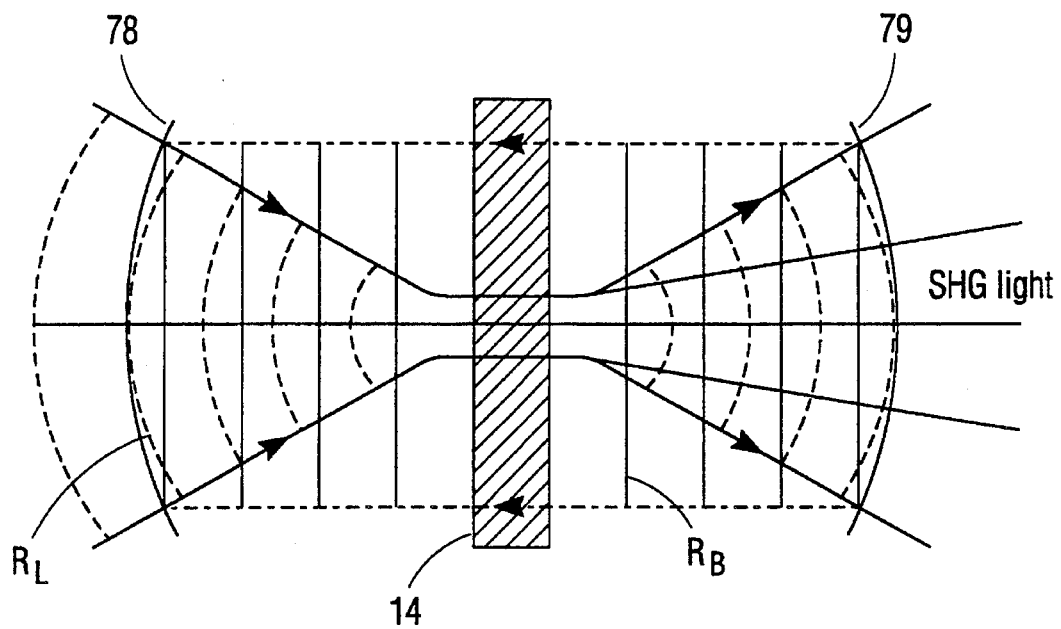
FIG. 8 is a drawing showing wavefronts (equiphase planes) of laser light inside a resonator.

At the first mirror 78 and second mirror 79, radius $R_L$, of the curvature of the wavefront of incident laser light L is smaller than each radius of curvature of the first mirror 78 and second mirror 79 (refer to FIG. 8). Thus, radius $R_B$ of the curvature of the wavefront of light reflected by the second mirror 79 is larger than radius $R_L$ of curvature of the wavefront of an incident light beam. Hence, under these conditions, the beam diameter of the laser light and the resonator, the beam diameter at the beam waist on the forward path (continuous line in FIGS. 7 and 8), is different from that on the backward path (dotted line in FIGS. 7 and 8). If the BBO crystal 14 is located at the position of the beam waist and SHG light is generated, the power of SHG light generated on the forward and backward paths is inversely proportional to the area of the beam diameter at the beam waist of each excitation light since the receptive angle of the crystal is sufficiently large. Thus, if the resonator and the laser light are set as this embodiment so that the beam diameter at the beam waist on the forward path is different from that on the backward path, power to generate SHG light (harmonic output) concentrates upon only excitation light in the direction (direction shown by the white-blanked arrow A) where a laser light with a small beam diameter proceeds. For example, if the ratio of the beam diameters on the forward and backward paths is 1:3 (1:5), the ratio of SHG light (harmonic output) becomes 9:1 (25:1), and thus, 90% (96%) of the converted power is concentrated in one direction.

In this manner and in accordance with the wavelength conversion device of this embodiment, since a resonator capable of a confocal resonator is used as an external resonator for wavelength conversion, a radius of curvature of a wavefront of a laser light reflected by a mirror toward a backward path can be made to be different from those of incident light and excitation light and, hence, SHG light generated through passing a crystal located near a beam waist is concentrated only upon the forward path. Therefore, a wavelength of light can be efficiently converted in a simple structure without complicated adjustment simply through adjusting the incident laser light so that the radius of curvature of the incident laser light is different from, that is, smaller than, that of a curved surface by disposing a crystal near a focal point using a resonator comprising a pair of curved surfaces functioning as a confocal system.

Figure 9:
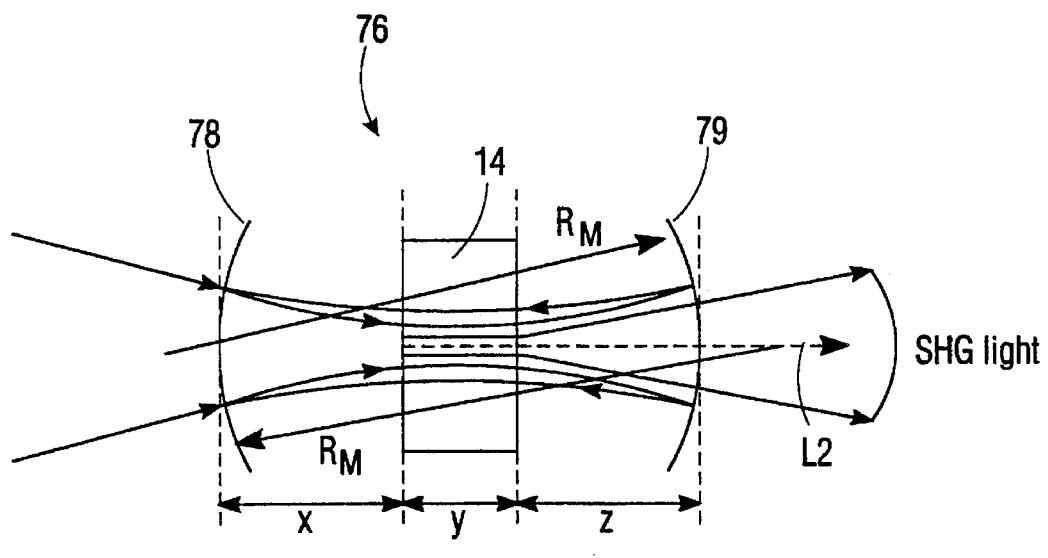
FIG. 9 is a drawing showing an example of a confocal resonator.

As an actual example of a confocal system configuration, as shown in FIG. 9, a resonator 76 comprises a first mirror of radius $R_M$ of curvature located at distance x from one side of a parallel-flat shape of a BBO crystal 14 at thickness y, and a second mirror of radius $R_M$ of curvature located at the distance z from another side of a BBO crystal 14. Then, if refractive index $n_2$ of the crystal is different from refractive index $n_1$ of a medium between the mirrors and the crystal, refractive index n is regarded as $n=n_2/n_1$, considering the refraction at a boundary and the relationship between radius $R_M$ of curvature and distances x and z is ( $R_M=x+y/n+z$).

Figure 10:
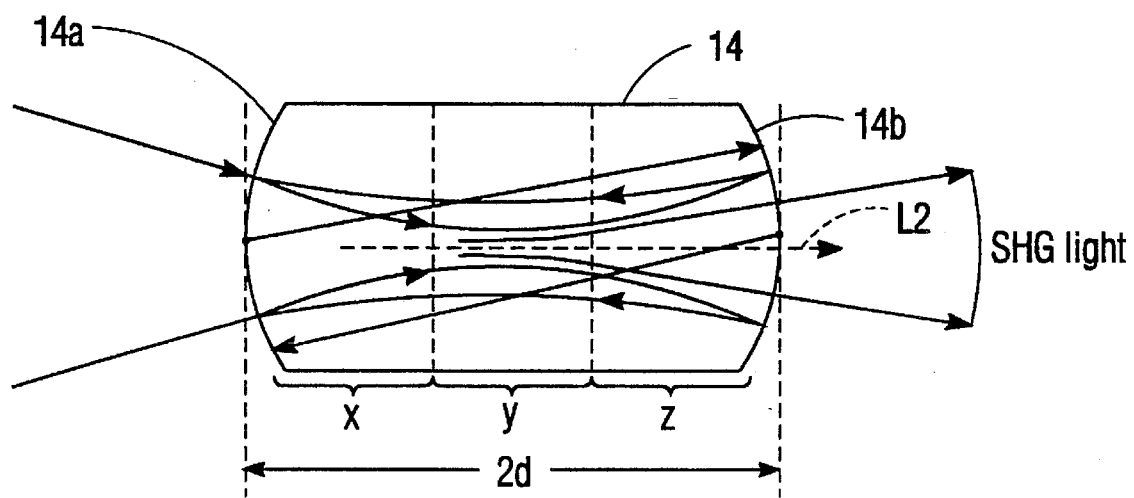
FIG. 10 is a drawing showing a resonator unifying a crystal and mirrors.

In addition, although, in the above embodiment, a case is described in which a BBO crystal 14 is located near the focal points of mirrors 78 and 79 having the same radius of curvature, the present invention is not limited to locating the crystal in the resonator comprising mirrors externally and, hence, it is possible to form a resonator 76 with only machined BBO crystal 14. Thus, it is possible to form a resonator with only a BBO crystal 14 through grinding and coating a light incidence section and a light radiation section of the crystal so as to get each radius $R_M$ of curvature. For example, as shown in FIG. 10, it is possible to form a monolithic confocal resonator through the grinding of a light incidence section 20a and a light radiation section 20b of the crystal so as to get each radius $R_M$ of curvature and make the center of curvature a center of the two sections of the resonator.

In this case, a laser light passing through the resonator always propagates in the crystal, but since the crystal has conditions for phase matching, SHG light is generated only when the conditions for phase matching are fulfilled. The effective section (distance) of the crystal generating this SHG light coincides with thickness y shown in FIG. 9.

In addition, although a resonator can be formed with only a crystal through processing the crystal itself as mentioned above, spherical grinding of a crystal is not easy and a crystal able only to function as the effective section (y) effectively generating SHG light is useless. For this reason, it is effective to form a central section (y) with only a crystal and to compose a block (x and z) being a mirror with a transparent medium such as glass having a similar refractive index, not using a monolithic crystal. This glass is generally easy to grind spherically. In this manner, since the required volume of the crystal can be reduced, the crystal can be used effectively. Furthermore, the crystal can be formed using only surface grinding, and glass can be used in easy spherical grinding. For this reason, the manufacturing of a resonator becomes easy.

The third embodiment will be described next. This is an application of the present invention to a double confocal resonator. However, since a wavelength conversion device of the third embodiment is similar in approximate configuration to the above embodiment, only a resonator with a different configuration will be described.

Figure 11:
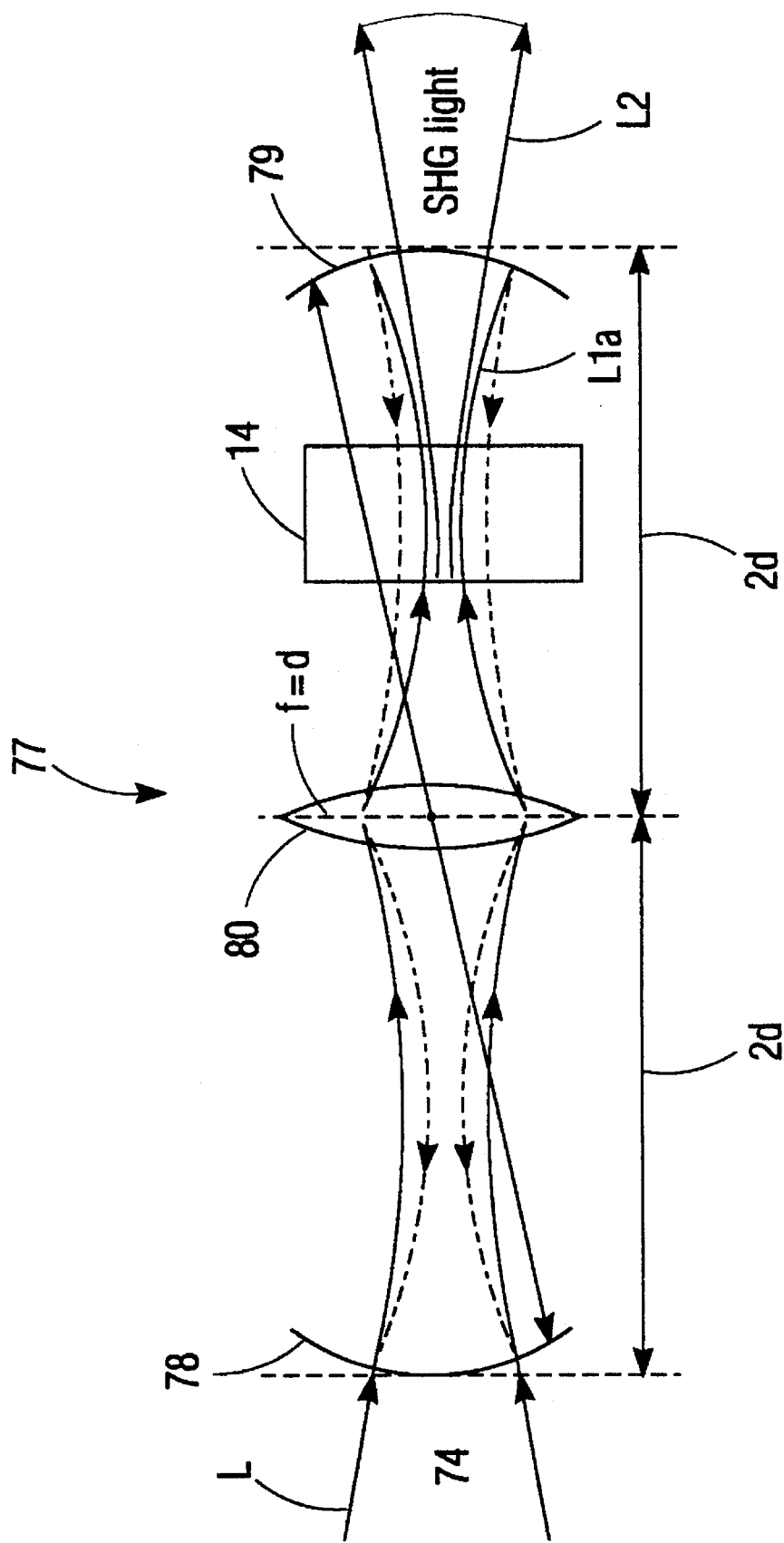
FIG. 11 is a drawing showing a conceptual configuration of a double confocal resonator according to a third embodiment.

As shown in FIG. 11, a resonator 77 is located at the radiation section of a laser light in a collimator lens system 74. A resonator 77 of this embodiment comprises a first mirror 78, a second mirror 79, and a lens 80 at focal length d. In the resonator 77 of this embodiment, the first mirror 78 and second mirror 79 are disposed so that positions of their centers of curvature coincide with each other, the lens 80 is disposed at this center of curvature, and a so-called double confocal resonator is formed. In addition, the BBO crystal 14 is disposed near a beam-condensing site of the lens 80.

Operation of a wavelength conversion device of the embodiment will be discussed next with the operation of laser light. Laser light L radiated from a collimator lens system 74 passes through a first mirror 78, the beam diameter gradually decreasing, and arrives at the lens 80 diffusing after once being condensed. The lens 80 condenses the incident laser light, which enters the BBO crystal 14 while the beam diameter is gradually reduced, and then a beam waist is formed in the crystal. In the BBO crystal 14, SHG light L2 is generated by the nonlinear optical effect. Generated SHG light L2 passes through the second mirror 79. Residual excitation light L1a not converted to SHG light L2 is reflected and the radius of curvature of its wavefront is changed at the second mirror 79. When the radius of curvature of its wavefront is changed, it is changed so as to diffuse in the diffusion direction, its beam diameter not being changed in the shrinking direction. Excitation light L1b, the radius of curvature of its wavefront changed, arrives at the lens 80 through the BBO crystal 14. The lens 80 condenses the incident laser light and radiates it to the first mirror 78. At the first mirror 78, the incident laser light is reflected and the radius of curvature of its wavefront is changed. Thus, the radius of curvature of the wavefront of excitation light L1b is changed so as to coincide with that of laser light L (i.e., excitation light L1) radiated from the collimator lens system 74. Excitation lights L1 and L1a are condensed with the lens 80 and arrive at the BBO crystal 14. In this manner, excitation light circulates in the resonator 77.

Figure 12:
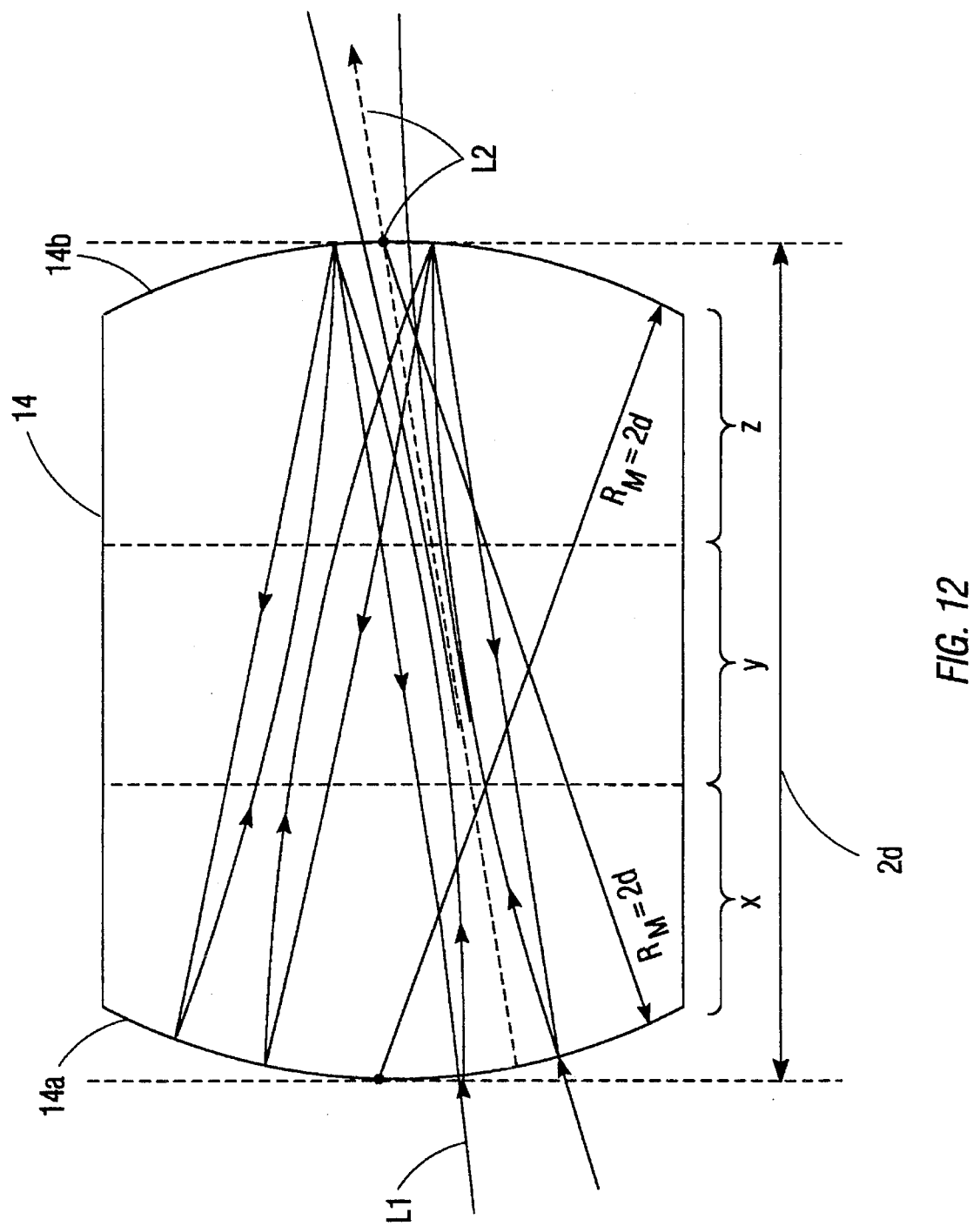
FIG. 12 is a drawing showing a double confocal resonator structured with only a crystal.

In an actual example of a double confocal system configuration, it is possible to form a resonator 76 with only machined BBO crystal 14. Thus, as is similar to the first embodiment, it is possible to form a resonator with only a BBO crystal 14 through grinding and coating a laser light incidence section and a light radiation section of the crystal so as to get each radius $R_M$ of curvature. For example, as shown in FIG. 12, grinding of an incidence section 14a and a radiation section 14b of laser light of the BBO crystal 14 can be done so as to get each radius $R_M$ of curvature and make the center of curvature a center of the two sections of the resonator. This is a configuration similar to FIG. 10, as mentioned above. The difference between the resonator in FIG. 10 and the resonator in FIG. 12 is in the direction of phase matching.

Furthermore, it is also possible to form a central section (y) with only a nonlinear optical crystal and to compose a peripheral section with a medium such as glass having a similar refractive index, not using a monolithic crystal. Moreover, it is also effective to form a central section (y) with only a crystal and to compose a block (x and z) being a mirror with a transparent medium such as glass having a similar refractive index, not processing only a crystal as mentioned above.

In the above first and second embodiments, although the shapes of beam diameters are not described, the shapes of beam diameters possible to be applied are not specified. Thus, in a confocal resonator and double confocal resonator, laser light (Gaussian beam) circulated once in the resonator has completely the same beam diameter and radius of curvature as incident laser light. This characteristic is applicable to the case in which the beam diameter and the radius of curvature of laser light in the vertical direction are different from those of laser light in the horizontal direction, that is, an ellipse beam. Thus, this is applicable to the case in which an ellipse focus is formed in a crystal. A light condensing method for this, as is well known, is a method wherein a cylindrical lens system 38 is located between a laser device 12 and BBO crystal 14 so as to change the shape of a beam diameter and the shape of a beam diameter of a beam waist can be set in a predetermined shape.

In this manner, in the above embodiment, using the simple structure of a Fabry-Perot resonator, SHG light in a single direction can be generated through changing curvature of wavefronts of incident light and radiated light by mirrors. Hence, although this is a Fabry-Perot resonator, there is no lack of stability from an interference effect occurring by a laser light on a forward path and a backward path, because there is no turning of the SHG light in the resonator. In addition, compared to the conventional wavelength conversion device using a ring resonator which requires complicated adjustment so as to obtain a high output, this is low cost and easy to adjust, and can be used in light frequency conversion in the desired wavelength range. Furthermore, in the case of using a double confocal resonator, since it automatically functions as a resonator if incident laser light is beside a predetermined position and direction, assembly is easy and requires no delicate adjustment. Moreover, this can produce a unified resonator formed with only a crystal, that is, a monolithic resonator formed with only a solid around a crystal.

Hence, in a wavelength conversion device involving a nonlinear optical effect using a Fabry-Perot or circulation resonator, a light wavelength can be converted, condensing mainly in one direction, the power of light of a new wavelength (i.e., SHG light) obtained through setting beam diameters and radiuses of curvature of wavefronts in optics of a resonator and incident light so that beam waist sizes of a laser light circulating in the resonator are different in the departing direction (forward path) and the returning direction (backward path).

In addition, a BBO crystal 14 can be composed as a nonlinear optical material of KDP, KTP, or $LiNbO_3$, used in the above embodiments.

The above confocal resonators are applicable to various laser wavelength conversions. For example, blue-near ultraviolet light can be obtained through frequency multiplication of an infrared-red semiconductor laser, and deep ultraviolet light can be obtained through frequency multiplication of a green-blue laser. Therefore, these resonators can be applied in applications using these lights, such as the manufacturing of semiconductor devices, material processing, display devices, printers, three-dimensional hologram players, optochemicals, measurements, reactive monitors, etc. In particular, blue-near ultraviolet light can be obtained through frequency multiplication of an infrared-red semiconductor laser, and this output can be used in high-density optical recording. Moreover, deep ultraviolet light obtained through frequency multiplication of a green-blue laser is suitable to be used in the manufacturing of semiconductor devices, material processing, etc.

Although the embodiments of the present invention are described above, the embodiment of the present invention has the following various implementation aspects:

Said resonance means is characterized by comprising a reflection-transmission means located at the radiation section of said nonlinear optical material for reflecting said light of the fundamental wavelength so that the shape of the cross-section of its optical beam with respect to a plane passing through the optical axis will differ from that of the incident optical beam and transmitting said light of the converted wavelength, and a reflection means disposed between said nonlinear optical material and said light radiation means for reflecting light reflected by said reflection-transmission means so that it will pass through an optical path approximately equal to a reference optical path through which said light of the fundamental wavelength that enters said nonlinear optical material passes and the shape of the cross-section of its optical beam will be approximately equal to that of said light of the fundamental wavelength.

In this manner, the resonance means comprises a reflection-transmission means and a reflection means. The reflection-transmission means located at the radiation section of said nonlinear optical material for reflecting said light of the fundamental wavelength so that the shape of the cross-section of its optical beam with respect to a plane passing through the optical axis will differ from that of the incident optical beam and transmitting said light of the converted wavelength. Thus, in the reflection-transmission means, only light of the fundamental wavelength among light arriving at the reflection-transmission means as the forward path from the light radiation means is reflected. Since the reflection optical beam in reflection has a cross-section of an optical beam with a shape different from that of the incident optical beam, the light toward the nonlinear optical material as a backward path after reflection at the reflection-transmission means does not meet conditions, such as phase matching of the nonlinear optical material. Thus, light generation of at least one converted wavelength differing from the fundamental wavelength becomes approximately zero in the backward path. The reflection means is located at the incident section of the nonlinear optical material for reflecting light reflected by said reflection-transmission means so that it will pass through an optical path approximately equal to a reference optical path through which said light of the fundamental wavelength that enters said nonlinear optical material passes and the shape of the cross-section of its optical beam will be approximately equal to that of said light of the fundamental wavelength. Thus, light arriving at the reflection means as the backward path from the reflection-transmission means is reflected so that the shape of the cross-section of its optical beam is equal to that of light proceeding to the nonlinear optical material as the forward path from the light radiation means. Therefore, in the reflection means, light reflected after proceeding on the backward path from the reflection-transmission means is added to incident light from the light radiation means, and the added light proceeds to the nonlinear optical material. Accordingly, since the light not converted to the light of the converted wavelength in proceeding on the forward path among the light of the fundamental wavelength proceeds again on the forward path, the nonlinear optical material generates, for example, the light of at least one converted wavelength differing from the fundamental wavelength only in one direction, the forward path.

Furthermore, each of the reflection-transmission means and the reflection means of said resonance means comprises, for example, a curved surface such as a spherical surface, wherein they have approximately the same radius of curvature, approximately the same focal length, and approximately the same reflection optical axis. In this structure, since a resonance means can be composed of a so-called confocal resonator, entered light can be enclosed, the light then circulating inside the resonance means.

As mentioned above, according to the embodiment of the present invention, since the resonance frequency of the resonator can be tuned in through the application of an electric field to the nonlinear optical material so that the resonance frequency of the resonator is tuned in the light of the fundamental wavelength, a compact, low-cost wavelength conversion device can be realized. In addition, through the application of an electric field to the nonlinear optical material so that the resonance frequency of the resonator is tuned in the light of the fundamental wavelength, high-frequency modulation in the nonlinear optical material can be performed and light strength of a modulated wavelength can be stably maintained.

Furthermore, according to the embodiment of the present invention, since light of the fundamental wavelength enters the nonlinear optical material and an electric field for modulating the resonator length is applied to the nonlinear optical material so that the light of the fundamental wavelength resonates, the resonator length can be modulated when incident light is converted to light of a converted wavelength and hence, in accordance with the applied electric field, light of at least one converted wavelength can be converted to light modulated in accordance with the resonator length.

Moreover, an optical path length can be minutely modulated at high speed using a BBO crystal for wavelength conversion to a wavelength conversion device.

What is claimed is:

1. A wavelength conversion device for conversion of light from a light radiation source that radiates light of a fundamental wavelength, comprising:

a resonator for receiving an incident optical light beam from the source and having a resonance frequency in accordance with a resonance length of an optical path within the resonator, the resonator including a plurality of light reflection means and a nonlinear optical material located so as to be irradiated by said incident optical beam, the nonlinear optical material outputting both the incident light of a fundamental wavelength and a light of at least one converted wavelength differing from the fundamental wavelength;

an electric field application means for applying an electric field to said nonlinear optical material so that said resonance frequency can be synchronized with said light of the fundamental wavelength; and an optical detection means located so as to be irradiated with light from said nonlinear optical material for detecting the intensity of light, wherein said electric field application means comprises a first electric field application means for applying an electric field to said nonlinear optical material to modulate said resonance frequency and a second electric field application means for applying an electric field to said nonlinear optical material in such a way that said resonance frequency obtained from the detected intensity of light equals the frequency of said light of the fundamental wavelength.

2. The wavelength conversion device set forth in claim 1 wherein said nonlinear optical material comprises a BBO crystal.

3. The wavelength conversion device set forth in claim 1 further comprising a reflection-transmission means located so as to be irradiated by light from said nonlinear optical material for reflecting said light of the fundamental wavelength as an optical beam having a cross-sectional shape that is different from the cross-sectional shape of the optical beam that is incident on the nonlinear optical material and for transmitting said light of the converted wavelength, and a reflection means disposed between said nonlinear optical material and said light radiation source for reflecting light reflected by said reflection-transmission means so that it will pass through an optical path approximately equal to a reference optical path through which said light of the fundamental wavelength that enters said nonlinear optical material passes and the shape of the cross-section of its optical beam will be approximately equal to that of said light of the fundamental wavelength.

* * * * *